No. 839,844. PATENTED JAN. 1, 1907.
W. J. HILLIARD.
CLUTCH.
APPLICATION FILED JAN. 16, 1906.

2 SHEETS—SHEET 1.

WITNESSES
J. H. O'Brien
L. V. Stoeltzlen

INVENTOR
William J. Hilliard
BY
Eugene Niven
ATTORNEY

No. 839,844. PATENTED JAN. 1, 1907.
W. J. HILLIARD.
CLUTCH.
APPLICATION FILED JAN. 16, 1906.

2 SHEETS—SHEET 2.

WITNESSES
J. H. O'Brien
L. V. Stoelzlen

INVENTOR
William J. Hilliard
BY
Eugene Diven
ATTORNEY

UNITED STATES PATENT OFFICE.

WILLIAM J. HILLIARD, OF BUFFALO, NEW YORK, ASSIGNOR TO THE HILLIARD CLUTCH & MACHINERY COMPANY, OF ELMIRA, NEW YORK.

CLUTCH.

No. 839,844.

Specification of Letters Patent.

Patented Jan. 1, 1907.

Application filed January 16, 1906. Serial No. 296,344.

*To all whom it may concern:*

Be it known that I, WILLIAM J. HILLIARD, a citizen of the United States, residing at Buffalo, in the county of Erie and State of New York, have invented certain new and useful Improvements in Clutches, of which the following is a specification.

This invention relates to improvements in friction-clutches whereby a mechanism to be driven is connected to a driving mechanism by frictional engagement between the two members of the clutch produced by the movement of clutch-shoes carried by one member into engagement with the other member; and it has to do particularly with improvements upon the clutch heretofore patented by me and described in United States Letters Patent No. 753,073, dated February 23, 1904, wherein the clutch-shoes are so combined with coöperating devices upon the driving and driven members of the clutch as to be automatically thrown into gripping position by the rotation of the driving member with relation to the driven member.

The objects of my present invention are to embody the ideas of my earlier invention in a simplified and more effective form; to reduce the number of parts, and thereby the cost of manufacture; to increase the contact-surfaces of the clutch-shoes, thereby rendering the clutch more powerful and effective; to provide, in combination with semicircular clutch-shoe segments, means for transmitting motion imparted to said segments at one end to the other end thereof, whereby the segments will be caused to move radially from the center of rotation and will have their gripping effect applied with equal force from one end to the other throughout their entire peripheries.

A further object is to provide means for throwing out of gear the automatic setting-up device without releasing the clutch, whereby the clutch-shoes after being set up to a certain degree of frictional engagement will permit the clutch members to slip one within the other in case of an increase in the power applied to the driving member or of an increased resistance in the driven member.

I attain my objects by arranging the several parts of my improved clutch in the manner substantially as illustrated in the accompanying drawings, in which—

Figure 1:
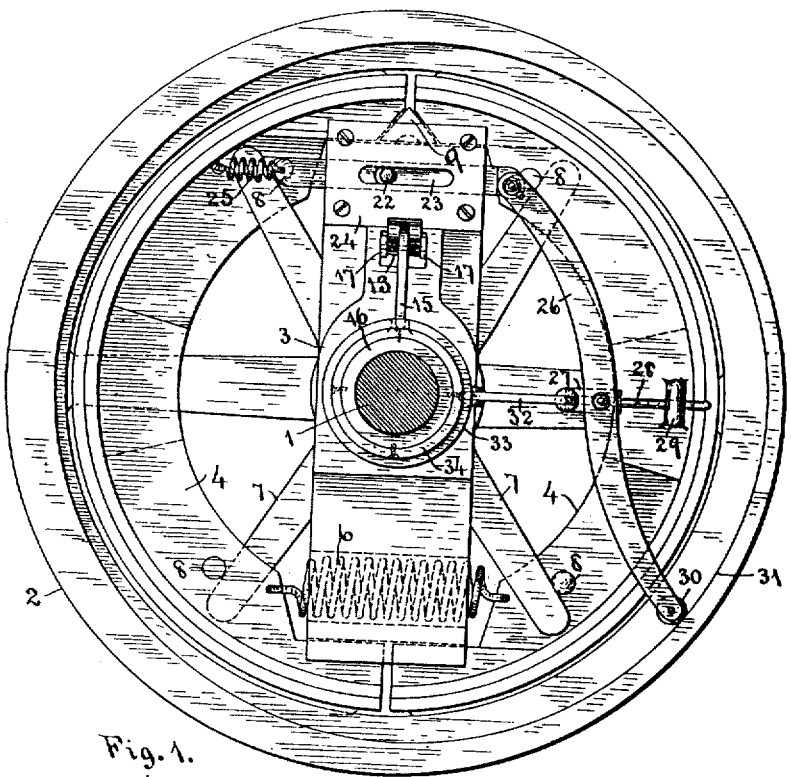
Figure 2:
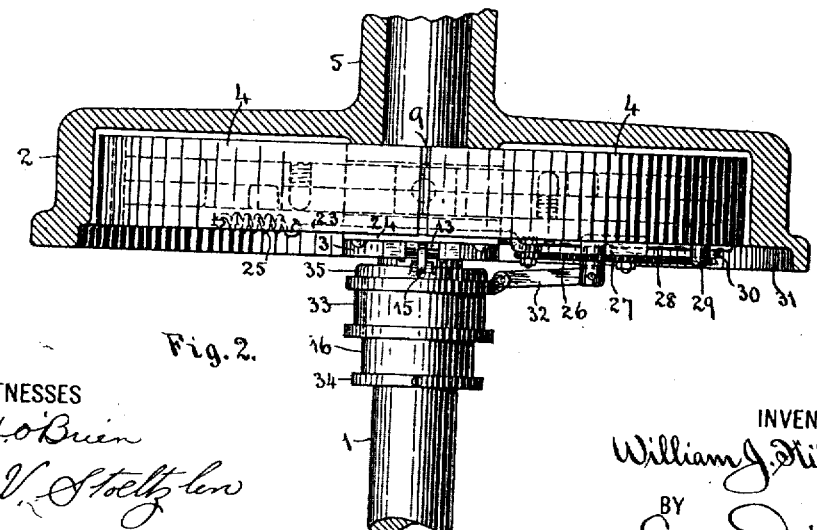
Figure 3:
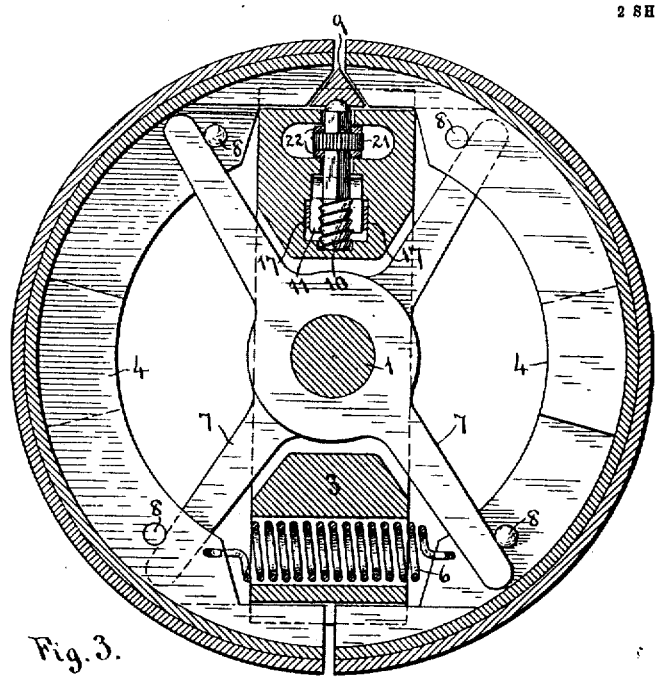
Figures 4, 5:
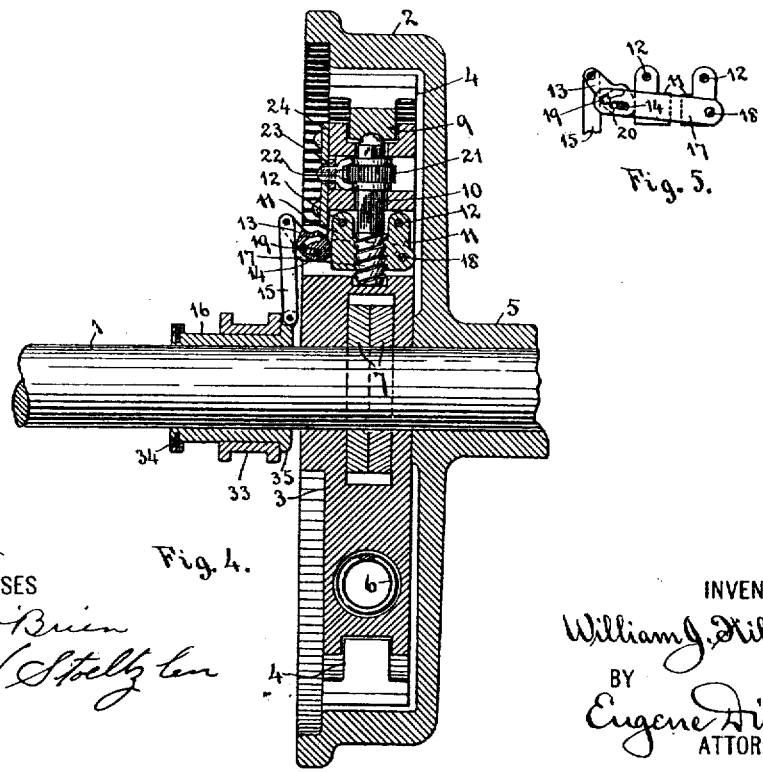

Figure 1 represents a side elevation of my complete clutch mounted upon a shaft shown in transverse section; Fig. 2, a plan view of the same, with the inclosing clutch member shown in horizontal section; Fig. 3, an elevation, partly in section, showing the clutch-shoes and the adjusting mechanism therefor; Fig. 4, a vertical longitudinal section of Fig. 1, and Fig. 5 a detail showing a side view of my divided nut and adjusting device.

Like numerals refer to like parts in the several views.

The clutch-shoes and their operating mechanism are carried by a cross-bar 3, which is mounted upon and fastened to the shaft 1, said cross-bar being positioned within the other member of the clutch, which consists of an annular ring 2, projecting laterally from spokes, or a web attached to a hub 5, which in describing the operation of the clutch will be considered as being loosely mounted upon the shaft 1. For the purpose of imparting motion to or from the clutch member 2 this hub 5 will have attached to it a pulley or gear or other device whereby to connect it with a driving or driven mechanism. It will be understood, of course, that the shaft 1 may be the driving member and the member 2 the driven member or the shaft 1 may be divided transversely where the cross-bar 3 abuts against the hub 5, said cross-bar being fastened to one part of the shaft and the hub 5 fastened to the other part, whereby motion in one portion of the shaft will be transmitted to the other portion when the clutch members are in engagement.

The segmental clutch-shoes 4 are positioned at each side of the cross-bar 3 and are supported and guided at each end in grooves formed at the ends of the cross-bar. The shoes are flanged along their outer edges, thereby forming semicylindrical surfaces, to which are applied friction-strips of fiber or other suitable material. The shoes are held in their retracted position by means of a spring 6, attached to the corresponding ends of opposite shoes and passing through a hole in the cross-bar 3. The action of this spring is to draw the shoes toward one another at one end, and the contractile force of the spring is transmitted with corresponding effect to the other end of the shoes by means of the crossed arms 7, which are pivoted upon the shaft 1 in a chamber provided therefor in the cross-bar 3 and have their opposite ends in engagement with pins 8, carried upon opposite clutch-shoes. One of the cross-arms 7 engages one side of the clutch-shoes and the other cross-arm the opposite side, the sides of the clutch-shoes being cut away at these points to receive the ends of the cross-arms. It will be evident, however, that the ends of the cross-arms may be offset where it is found not desirable to reduce the thickness of the clutch-shoes. The effect of these cross-arms is to transmit motion in the end of one of the clutch-shoes to the opposite end of the other clutch-shoe. Therefore the retractive action of spring 6 at one end of the clutch-shoes will be transmitted through these cross-arms to the opposite ends of said shoes, thereby drawing the shoes together with equal effect at each end thereof and causing them to be moved in radially toward the shaft 1.

In order to expand the shoes and set them in gripping engagement with the member 2, I bevel the shoes at the ends opposite the spring 6 and place in the groove at that end of the cross-bar 3 a wedge-block 9, the radially-outward motion of which wedge-block will force the clutch-shoes apart, the spreading effect of the wedge-block at this end of the shoes being transmitted with equal force and effect to the opposite ends through the cross-arms 7.

The mechanism for radially projecting the wedge-block comprises an adjusting-screw 10, positioned in radial bearings formed in the cross-bar 3 and provided at its inner end with screw-threads adapted to be engaged by the divided nut 11. The halves of this nut are pivoted upon pins 12 in a chamber or slot passing through the cross-bar 3. For the purpose of throwing the halves of the nut into engagement with the thread on the adjusting-screw a cam-lever 13 is pivoted in the cross-bar 3 upon the pin 14, said cam-lever being coupled by link 15 to the shifting sleeve 16, which is splined to the shaft 1 in the usual manner and is capable of being moved to and from the cross-bar 3. The cam-lever 13 is so formed that when it is thrown outward by the movement of sleeve 16 toward the cross-bar it will act upon one of the halves of the nut to throw it into engagement with the adjusting-screw, and when the cam-lever is thrown inward by the outward movement of the shifting sleeve it will leave that half of the nut free to swing outward away from the screw. The other half of the nut is actuated from the cam-lever by means of links 17 at each side, coupled thereto by the pin 18. At the outer end these links are coupled together by pin 19, which passes through a cam-slot in the cam-lever 13. The effect of said slot when the cam-lever is oscillated is to throw this half of the nut into or out of engagement with the adjusting-screw, as will be evident from an inspection of Figs. 4 and 5. The links 17 are slotted at 20, where they pass by the pin 14, these slots forming bearings on said pin, whereby the action of the cam-lever upon the pin 19 is rendered effective to reciprocate the links.

When the divided nut is in engagement with the adjusting-screw and said screw is rotated in the right direction, it will be evident that radial motion will also be transmitted to the screw to force the wedge-block against the clutch-shoes. To effect this rotation, I provide at 21 a ratchet-wheel, which is so mounted upon the adjusting-screw as to permit the screw to slide back and forth through it and yet be rotated by it. To accomplish this sliding engagement between these parts, I have shown the adjusting-screw squared beyond its threaded portion, the ratchet-wheel having a corresponding square eye through which this portion of the adjusting-screw passes. The ratchet-wheel may, however, be splined to the screw, if desired, either of these modes of connection being common expedients. The ratchet-wheel is positioned in a slotted chamber in the cross-bar 3, and a ratchet-arm 22, having forked bearings upon the adjusting-screw at each side of the ratchet-wheel, projects out from said chamber through a hole in a slide-bar 23 and into a slotted bearing in the cover-plate 24, attached to the face of the cross-bar 3. The ratchet-arm 22 carries a spring-actuated pawl, which engages the teeth of the ratchet-wheel, when said bar is oscillated to impart motion to the ratchet-wheel from the reciprocations of the slide-bar 23. This slide-bar passes through grooved bearings provided therefor in the face of the cross-bar 3 back of the cover-plate 24 and projects at each side of the cross-bar. One end of the slide-bar is coupled to one of the clutch-shoes by means of the spring 25, and the other end is coupled to the operating-lever 26, which is centrally pivoted upon a slide 27 and has its free end provided with a roller 30 to engage the cam-surface 31, formed on the outer face of the ring 2. The slide 27 is mounted upon a rod 28, the inner end of which is attached to the cross-bar 3, the outer end being supported in a lug 29 on one of the clutch-shoes. The slide 27 is coupled to sleeve 33 by means of link 32, and said sleeve is mounted upon and rotates with the sleeve 16. It is free, however, to slide longitudinally upon the sleeve 16 to a certain extent—namely, between the collars 34 and 35. The sleeve 33 is grooved to receive the usual shifting-lever.

Having thus described the several parts of my clutch, the operation thereof will be understood as follows: When the shifting-lever is thrown so as to move the sleeve 33 toward the cross-bar 3, said sleeve will strike collar

35 on sleeve 16 and carry with it said sleeve, thereby throwing the halves of the divided nut into engagement with the adjusting-screw. At the same time the inward motion of link 32 will throw slide 27 outward, thereby carrying the pivotal point of lever 26 outward and throwing roller 30 into engagement with cam-surface 31. With the parts of the clutch so positioned the rotation of either of the members 2 or 3, whichever member constitutes the driving member, will effect repeated oscillations of the lever 26 by reason of the cam 31 acting upon the free end of said lever, the roller on said free end of the lever being held in engagement with the cam-surface by reason of the pull exerted upon slide-bar 23 by spring 25. As the lever 26 oscillates it will cause the slide-bar 23 to reciprocate, thereby oscillating the ratchet-arm 22 and imparting motion to the ratchet-wheel 21. A partial revolution of the ratchet-wheel is therefore accomplished at each revolution of the driving member of the clutch with reference to the driven member (as the cam 31 is herein illustrated.) The adjusting-screw will be moved outward radially by a step-by-step motion, thereby gradually forcing the wedge-block 9 between the clutch-shoes and throwing said clutch-shoes into engagement with the cylindrical bearing-surface of the member 2. The driving and driven members of the clutch will therefore be automatically and gradually thrown into clutching engagement by reason of these coacting devices carried by the two principal clutch members. With the sleeves 33 and 16 set in the positions assumed for them in Figs. 1, 2, and 4 of the drawings, if after the clutch members have been thrown into engagement further slippage occurs between the members this slippage will be automatically taken up by the continued action of the cam-surface upon the free end of the lever 26. Should it be desirable, however, after a certain degree of frictional engagement is attained between the two members of the clutch, to prevent the further action of this automatic take-up, the sleeve 33 will be moved outward on the sleeve 16 until it strikes collar 34, in which position of the sleeve link 32 will be drawn out sufficiently to retract slide 27 and throw the free end of lever 26 out of engagement with cam-surface 31. With the parts so positioned subsequent slippage between the clutch members will not actuate the automatic take-up, and the clutch will continue to slip until conditions which obtained before the slippage are reëstablished. I thus provide a clutch which will fulfil the requirements where it is desirable that a sudden increase in power in the driving member shall not be transmitted to the driven member or where an increase of resistance in the driven member must not be transmitted to the driving member. To release the clutch, sleeves 33 and 16 are both thrown away from the cross-bar 3 sufficiently to cause cam-lever 13 to release the divided nut from engagement with the adjusting-screw. The retractive effect of spring 6 will then act, through wedge-block 9, to move the adjusting-screw inward, thereby permitting the clutch-shoes to be withdrawn from engagement with member 2. The screw-threads on the adjusting-screw will preferably be beveled in the manner illustrated in the drawings in order that the inward motion of the screw will assist in spreading apart the halves of the divided nut. When the shifting sleeves are thrown outward, the clutch-shoes are returned immediately to their normal unlocking positions, and upon each inward movement of the sleeves the shoes are gradually and automatically moved into their clutching positions. There can be no sudden starting of the driven mechanism where my clutch is used and the only manual power necessary to operate the clutch is that which is required to shift the sleeves. If desired, the links 15 and 32 may both be coupled to the sleeve 16 and the sleeve 33 dispensed with, in which event the automatic take-up device will always be held in operative position except when the clutch is thrown out. By changes in the form of the cam-surface 31 the take-up may be made to operate more or less rapidly, as may be desirable. Also I do not confine myself to the specific arrangement of the clutch-shoes as herein described, since my automatic adjusting devices may be applied to other forms and arrangements of clutch-shoes with good effect, although for efficiency I prefer the shoes arranged and operated in the manner set forth.

Having thus described my improved clutch and pointed out the specific features of novelty, what I claim as new, and desire to secure by Letters Patent, is—

1. A clutch comprising driving and driven members, one of which members is provided with a clutch-shoe to engage the other member, an adjusting-screw adapted to actuate said shoe, a divided nut having its parts pivotally mounted at opposite sides of said screw, and means for moving the parts of said nut into and out of engagement with the screw.

2. A clutch comprising driving and driven members, one of which members is provided with a clutch-shoe to engage the other member, an adjusting-screw adapted to actuate said shoe, a divided nut having its parts pivotally mounted at opposite sides of said screw, and means for moving the members of said nut into and out of engagement with the screw, the driving and driven members being provided with coöperating devices whereby the adjusting-screw will be automatically rotated by the rotation of one member with respect to the other.

3. A clutch comprising driving and driven members, one of which members is provided with a clutch-shoe to engage the other member, an adjusting-screw adapted to actuate said shoe, a divided nut having its parts pivotally mounted at each side of said screw, a cam-lever engaging one of said parts, a pin passing through a cam-slot in said lever, links coupling said pin to the other part of the nut, and means for actuating said lever to move the nut into and out of engagement with the screw, the driving and driven members being provided with coöperating devices whereby the adjusting-screw will be automatically rotated by the rotation of one member with respect to the other.

4. A clutch comprising driving and driven members, one of which members is provided with a clutch-shoe to engage the other member, an adjusting-screw adapted to actuate said shoe and a divided nut having manually-operated means for moving its parts into and out of engagement with the screw, coöperating devices upon the two members whereby the adjusting-screw will be automatically rotated by the rotation of one member with respect to the other, and means coupled to the nut-adjusting means for moving one of said coöperating devices into and out of operative position.

5. A clutch comprising driving and driven members, one of which members is provided with a clutch-shoe to engage the other member, an adjusting-screw adapted to actuate said shoe and a divided nut having manually-operated means for moving its parts into and out of engagement with the screw, coöperating devices upon the two members whereby the adjusting-screw will be automatically rotated by the rotation of one member with respect to the other, means for moving one of said devices into operative position when the nut is thrown into engagement with the screw, and means for moving said device out of operative position without releasing the nut.

6. A clutch comprising driving and driven members, a clutch-shoe on one of said members to engage the other member, adjusting mechanism for moving said shoe into clutching contact with the latter member, coöperating devices upon the two members whereby motion is imparted to the adjusting mechanism automatically by the rotation of one member with respect to the other, means for throwing the adjusting mechanism into and out of gear with said coöperating devices, means for retracting the clutch-shoe when the adjusting mechanism is out of gear, and means for moving one of said coöperating devices into and out of operative position.

7. A clutch comprising driving and driven members, a clutch-shoe carried by one of said members, an adjusting-screw adapted to move said shoe into engagement with the other member, a ratchet-wheel adapted to rotate said screw, a reciprocating bar on the shoe-carrying member, a pawl actuated thereby to turn the ratchet-wheel, a lever pivoted on said member with one arm coupled to the reciprocating bar and the other arm engaged by a cam-surface on the other member, a divided nut mounted on the shoe-carrying member, means for moving the parts of said nut into and out of engagement with the adjusting-screw, said screw being adapted to slide through the ratchet-wheel to actuate the clutch-shoe, and means for retracting the shoe and adjusting-screw when the latter is disengaged from the nut.

8. A clutch comprising driving and driven members, a clutch-shoe carried by one of said members, an adjusting-screw adapted to move said shoe into engagement with the other member, a pawl-and-ratchet gear through which said screw slides and by which it is adapted to be rotated, a lever mounted upon a sliding pivot-block on the shoe-carrying member, one arm of said lever being operably connected with the ratchet-gear and the other arm being adapted to engage a cam-surface on the other member, a shifting sleeve coupled to the pivot-block to throw said lever into and out of engagement with said cam-surface, a divided nut mounted on the shoe-carrying member, means also actuated by said shifting sleeve for moving the parts of said nut into and out of engagement with the adjusting-screw, and means for retracting the clutch-shoe and adjusting-screw when the latter is released by the nut.

9. A clutch comprising driving and driven members, a clutch-shoe carried by one of said members, an adjusting-screw adapted to move said shoe into engagement with the other member, a pawl-and-ratchet gear through which said screw slides and by which it is adapted to be rotated, a lever mounted upon a sliding pivot-block on the shoe-carrying member, one arm of said lever being operably connected with the ratchet-gear and the other arm being adapted to engage a cam-surface on the other member, a divided nut mounted on the shoe-carrying member, a shifting sleeve, means coupled to said sleeve for moving the parts of said nut into and out of engagement with the adjusting-screw, a second sleeve mounted to slide to a limited extent on the first sleeve, and means whereby said second sleeve will actuate the pivot-block.

10. A clutch comprising driving and driven members, segmental clutch-shoes carried by one of said members and adapted to be thrown into engagement with the other member, means for imparting motion to said shoes at one end, and pivotal cross-arms, each having one end in engagement with one of said shoes adjacent one end thereof and the other end in engagement with the opposite shoe adjacent its other end, whereby motion at one end of the shoes is transmitted to the other end thereof.

11. A clutch comprising driving and driven members, a cross-bar mounted on one of said members, a pair of oppositely-disposed segmental clutch-shoes adapted to engage the other member and having their ends guided in grooves at the ends of the cross-bar, a spring extending between shoes at one end to retract them, cross-arms pivoted in the cross-bar and having their opposite ends in engagement with opposite shoes adjacent the opposite ends thereof, whereby motion at one end of the shoes is transmitted to the opposite end thereof, and means for expanding the shoes applied to the ends thereof opposite the spring.

12. A clutch comprising driving and driven members, a cross-bar mounted on one of said members, a pair of oppositely-disposed segmental clutch-shoes having their ends guided in grooves at the ends of the cross-bar, a spring extending between the shoes at one end to retract them, cross-arms pivoted in the cross-bar and having their opposite ends in engagement with opposite shoes adjacent the opposite ends thereof whereby motion at one end of the shoes is transmitted to the other end, a wedge-block positioned between the ends of the shoes opposite the spring, a device for actuating the wedge-block to expand the shoes, and means for releasing said actuating device to permit the shoes to contract.

In testimony whereof I have affixed my signature in presence of two witnesses.

WILLIAM J. HILLIARD.

Witnesses:
CHARLES M. REINIG,
CHAS. J. DICKMAN.